(12) United States Patent
Sonnek et al.

(10) Patent No.: US 6,945,019 B1
(45) Date of Patent: Sep. 20, 2005

(54) HARVESTER STEERING PROBE ASSEMBLY

(75) Inventors: Tom Foster Sonnek, Reinbeck, IA (US); Mark Samuel Philips, Grimes, IA (US); Daniel John Johannsen, Ankeny, IA (US); Scott Francis Stueck, Ankeny, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/930,963

(22) Filed: Aug. 31, 2004

(51) Int. Cl.[7] .............................................. A01D 75/28
(52) U.S. Cl. ...................... 56/10.2 F; 56/28; 56/15.5; 56/DIG. 11; 172/2; 172/5
(58) Field of Search ............................... 56/10.2 F, 28, 56/15.5, DIG. 11, 10.2 D, 11.9, 13.5, 13, 56/14.9, 37, DIG. 16, 288; 172/2, 3, 5, 6, 172/446, 449

(56) References Cited

U.S. PATENT DOCUMENTS

| | | | |
|---|---|---|---|
| 3,196,599 A * | 7/1965 | Meiners et al. .......... 56/10.2 E |
| 3,566,972 A * | 3/1971 | Chernyakov et al. .......... 171/8 |
| 4,126,984 A * | 11/1978 | Gail ........................ 56/10.2 R |
| 4,166,349 A * | 9/1979 | Coenenberg et al. ..... 56/10.2 F |
| 4,249,365 A * | 2/1981 | Hubbard et al. .............. 56/13.2 |
| 4,726,175 A * | 2/1988 | Day et al. .................. 56/10.2 F |
| 4,989,365 A * | 2/1991 | Roger ...................... 47/1.01 R |
| 5,185,990 A * | 2/1993 | Barnes et al. ................... 56/51 |
| 5,307,611 A | 5/1994 | Vardeman et al. ........... 56/10.2 |
| 5,419,105 A * | 5/1995 | Barnes et al. ............. 56/10.2 F |
| 6,079,192 A | 6/2000 | Rasmussen .............. 56/10.2 F |
| 6,212,864 B1 | 4/2001 | Harden et al. .................. 56/36 |
| 6,293,078 B1 | 9/2001 | Deutsch et al. ................ 56/44 |
| 6,550,230 B2 | 4/2003 | Fox ................................ 56/44 |

* cited by examiner

Primary Examiner—Árpád Fábián Kovács

(57) ABSTRACT

A compact three-bar linkage steering probe assembly, particularly useful with ultra-narrow row cotton harvester units, includes two vertical rocker arms pivotally connected to a harvester row unit at mid-point locations and upper ends connected by a cross link to generally constrain the arms for rocking in unison. Crop guides connected to the lower ends of the rocker arms follow the bases of the plant stalks as the row of plants enter the unit. The vertical arms are maintained within spacer tubes which prevent interference with adjacent rows of plants and which assure the arms are not disturbed by the adjacent rows. A sensor responsive to rotation of the rocker arms is located at the central pivotal connection. Arm leaf springs or a spring biased adjustable upper cross link provides probe flexibility for accommodating different plant stalk sizes.

20 Claims, 4 Drawing Sheets

HARVESTER STEERING PROBE ASSEMBLY

FIELD OF THE INVENTION

The present invention relates generally to agricultural harvesters and, more specifically, to a probe assembly useful for guiding an implement such as a harvester relative to rows of crop.

BACKGROUND OF THE INVENTION

Steering probes such as shown in U.S. Pat. No. 5,307,611 include a yoke or pendulum structure with an upper end pivotally mounted to a harvester for pivotal movement about a horizontal axis. A sensor at the pivotal mounting senses the rotational position of the yoke as lower ends of the yoke engage the opposite sides of the crop row. As the yoke pivots from a neutral position when the harvester becomes misaligned with the crop row, the sensor provides an error signal so the vehicle can be steered to compensate for the misalignment with the crop row. Such steering probes are commonly utilized with cotton harvesters to keep row units aligned with rows of cotton plants.

Because of the geometry and pivot location of conventional steering probes, they are not readily adaptable to narrow row harvesters. For example, in ultra-narrow row cotton, interference results between the pendulum structure and a row of cotton adjacent the row entering the row-receiving area of the unit. Rotation of the pendulum structure about the upper pivot as the row becomes misaligned with the unit is very limited, and the relatively small angular displacement of the pendulum results in a correspondingly small sensor signal which can lead to sensing inaccuracies, non-repeatability, and slow steering response.

Previously available steering probes are not readily adaptable to row units with variable row spacing such as shown in commonly assigned U.S. Pat. Nos. 6,550,230; 6,293,078 and 6,212,864. The variable row spacing units include a cutting device for directing a cut row of crop into a standing row, and mounting steering probes on either the cut or the standing side of the row units has been a continuing source of difficulty.

Large diameter stalks passing between the lower ends of a relatively rigid probe can result in further problems. Without adequate probe flexibility, plant movement between the ends is hampered, damage to crop can result from passage through the ends of the probe, and the assembly encounters added stress and wear. If the operator adjusts the probe end spacing to accommodate the largest plants without damage, probe sensitivity to row misalignment is compromised in areas of the row where smaller plants are encountered.

SUMMARY OF THE INVENTION

It is therefore an object of the present invention to provide an improved row guidance probe assembly. It is a further object to provide such an assembly which overcomes the aforementioned problems and which is compact and simple in design. It is another object to provide such an assembly which is easily mounted on narrow row harvesting units including variable row spacing units.

It is a further object to provide an improved row guidance probe assembly particularly useful with narrow row harvesters. It is still another object to provide such an assembly which facilitates probe movement through plants of varying stalk thickness without damage to the plant or assembly while assuring accurate and repeatable row misalignment signals.

A steering probe assembly of simple and compact design is provided with a three-bar linkage having two vertical rocker arms pivotally connected to the unit at mid-point locations and connected by an upper cross link pivotally connected to upper ends of the arms. Crop guides connected to the lower ends of the arms follow the bases of the plant stalks as the row of plants enter the unit. The vertical arms are generally contained within spacer tubes which prevent interference with adjacent rows of plants and which assure the arms are not disturbed by the adjacent rows. A sensor responsive to rotation of the rocker arms at the central pivotal connection with the unit provides accurate and repeatable misalignment signals. The central pivots approximately double the angular displacement of the sensor compared to most pendulum arrangements with upper pivots. The compact design allows use of the probe assembly adjacent either the cut or standing row throat area of a narrow row configuration having variable row spacing. The assembly can be sandwiched between the row unit and stalk lifter frame at either throat area and can be easily retrofitted to existing row units.

The vertical arms can include a leaf spring or other resilient biasing structure located above, below or at the pivot to incorporate flexibility that allows the distance between the crop guides to vary with changes in plant stalk thickness. In another embodiment, the upper cross link can a variable length member with a compression spring or other biasing member to facilitate passage of varying diameter plant stalks between the crop guides. The probe flexibility prevents plants from being damaged or torn out of the ground, assures good probe action in all sizes of crop and reduces probe damage and wear.

These and other objects, features and advantages of the present invention will become apparent to one skilled in the art upon reading the following detailed description in view of the drawings.

DESCRIPTION OF THE PREFERRED EMBODIMENT

Figure 1:
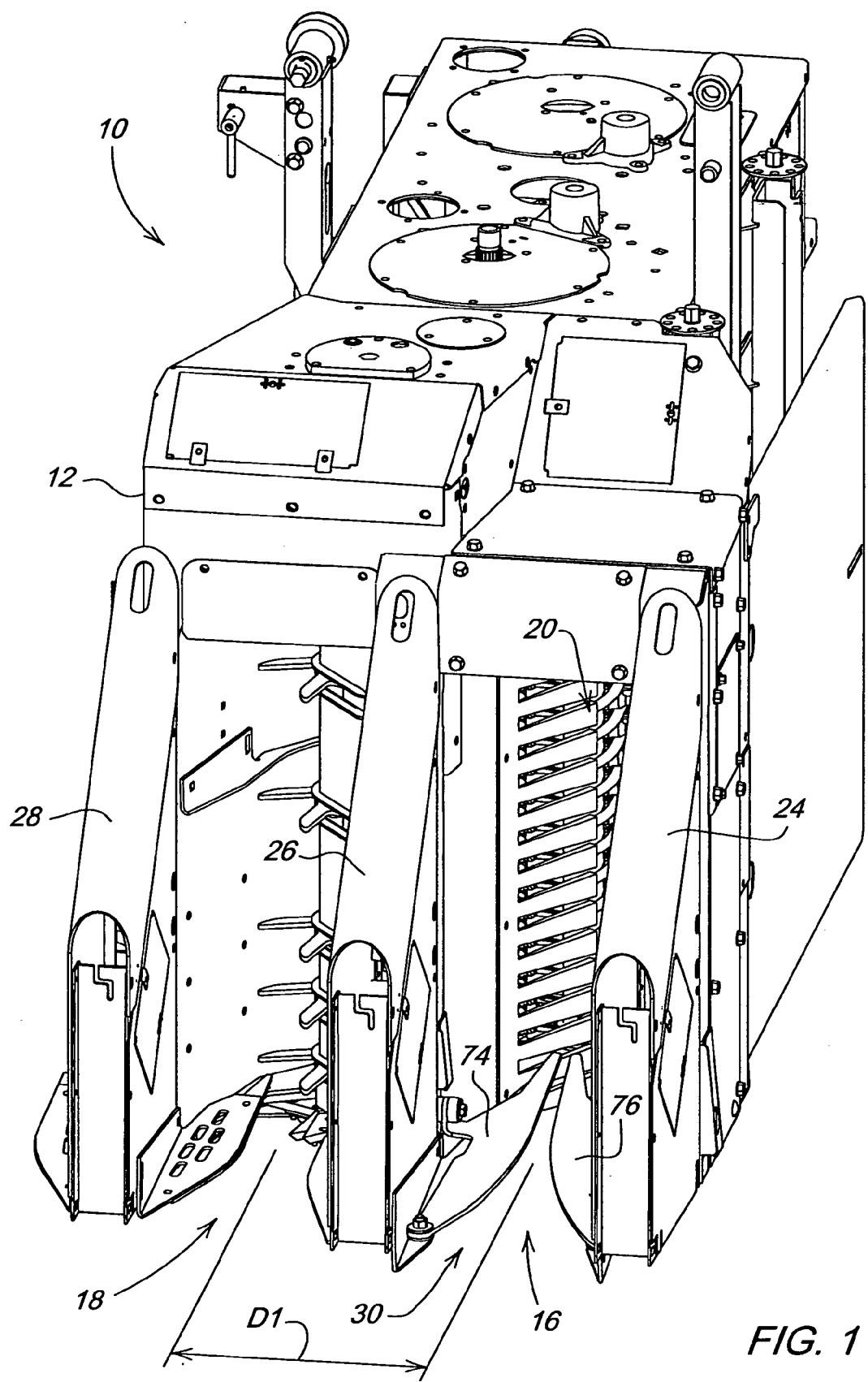
FIG. 1 is a front perspective view of a portion of a cotton harvester row unit with portions removed to better show the steering probe assembly.

Referring now to FIG. 1 therein is shown a cotton harvester row unit 10 adapted for mounting on a cotton harvester row unit support frame (not shown) of a cotton picker or similar implement. The row unit 10 includes a row unit frame 12 supported for forward movement relative to rows of cotton plants spaced apart a distance D1. The harvester and row unit 10 may be generally of the type shown and described in commonly assigned U.S. Pat. No. 6,550,230 or 6,293,078 and can be used for harvesting ultra-narrow row cotton wherein the plant row spacing D1 is fifteen inches or less. Adjacent rows of cotton plants enter throat areas 16 and 18 of the row unit 10. The first row of plants enters the area 16 uncut, and the adjacent row entering the area 18 is severed and moved laterally into the standing row. The cotton plants are then engaged by conventional spindle structure indicated generally at 20 that removes cotton from the plants.

Stalk lifters 24, 26 and 28 project forwardly from the unit frame 12 and help guide the rows of cotton plants into the throat areas 16 and 18. As the harvester unit 10 is moved forwardly relative to the rows of cotton plants, proper alignment of the throat areas 16 and 18 with the rows is required for optimum productivity. Deviating from that alignment can cause problems such as crop loss, plant damage and increased row unit wear. To help the operator maintain row alignment with the units and provide opportunity for automatic steering of the harvester, a row finder probe assembly 30 is supported from the unit frame 12.

Figure 2:
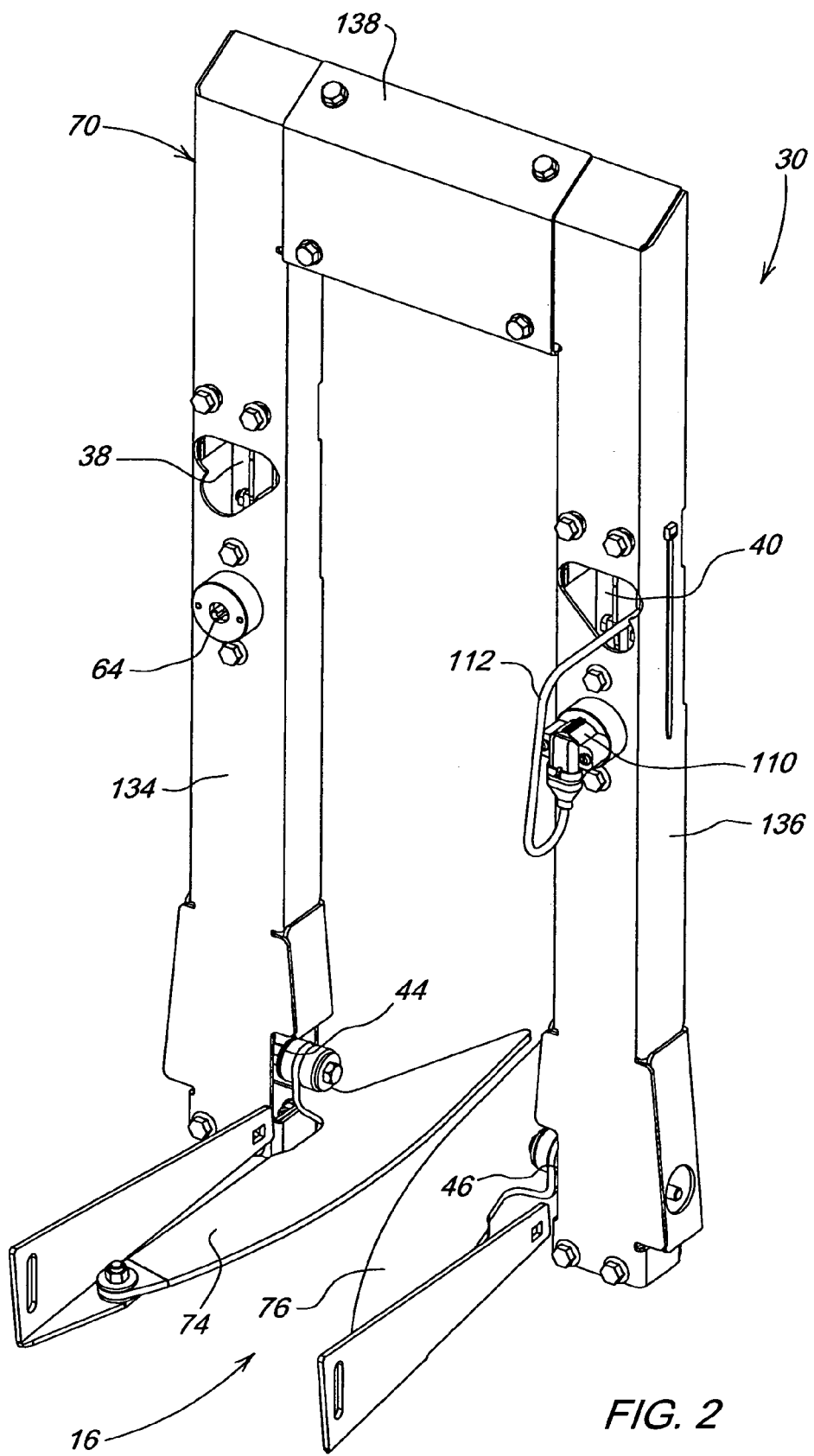
FIG. 2 is a front perspective view of the steering probe assembly of FIG. 1.

The probe assembly 30 (FIGS. 2 and 3) is generally constructed as a three-bar linkage and includes first and second transversely spaced upright arms 34 and 36 with upper ends 38 and 40 (FIG. 3) and lower ends 44 and 46. The upper ends 38 and 40 are connected by link structure 48 pivotally connected at opposite end portions to inwardly turned brackets 54 and 56 by bolts 58 and 60. Central portions of the upright arms 34 and 36 are connected by pivots 64 and 66 to a probe frame assembly 70 having an inverted U-shape configuration and connected to the row unit frame at the throat area 16 which receives the standing row of crop. Transversely spaced crop guides 74 and 76 are connected to the lower ends 44 and 46 of the arms by transversely extending bolt members 78 and 80 and define a curved, rearwardly converging plant stalk guide area at the lower portion of the throat 16.

Figure 3:
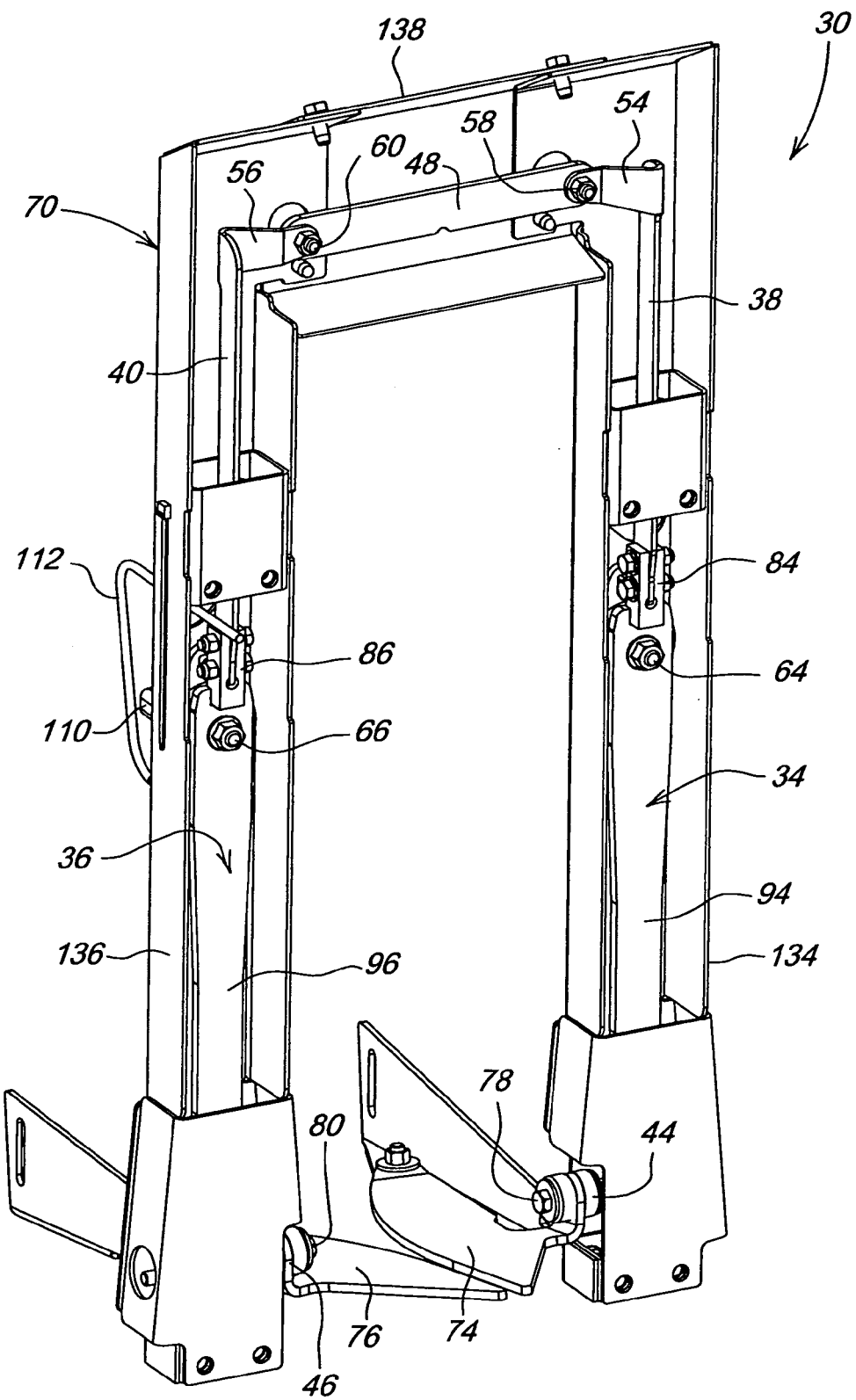
FIG. 3 is a rear perspective view of the steering probe assembly of FIG. 2.
Figure 4:
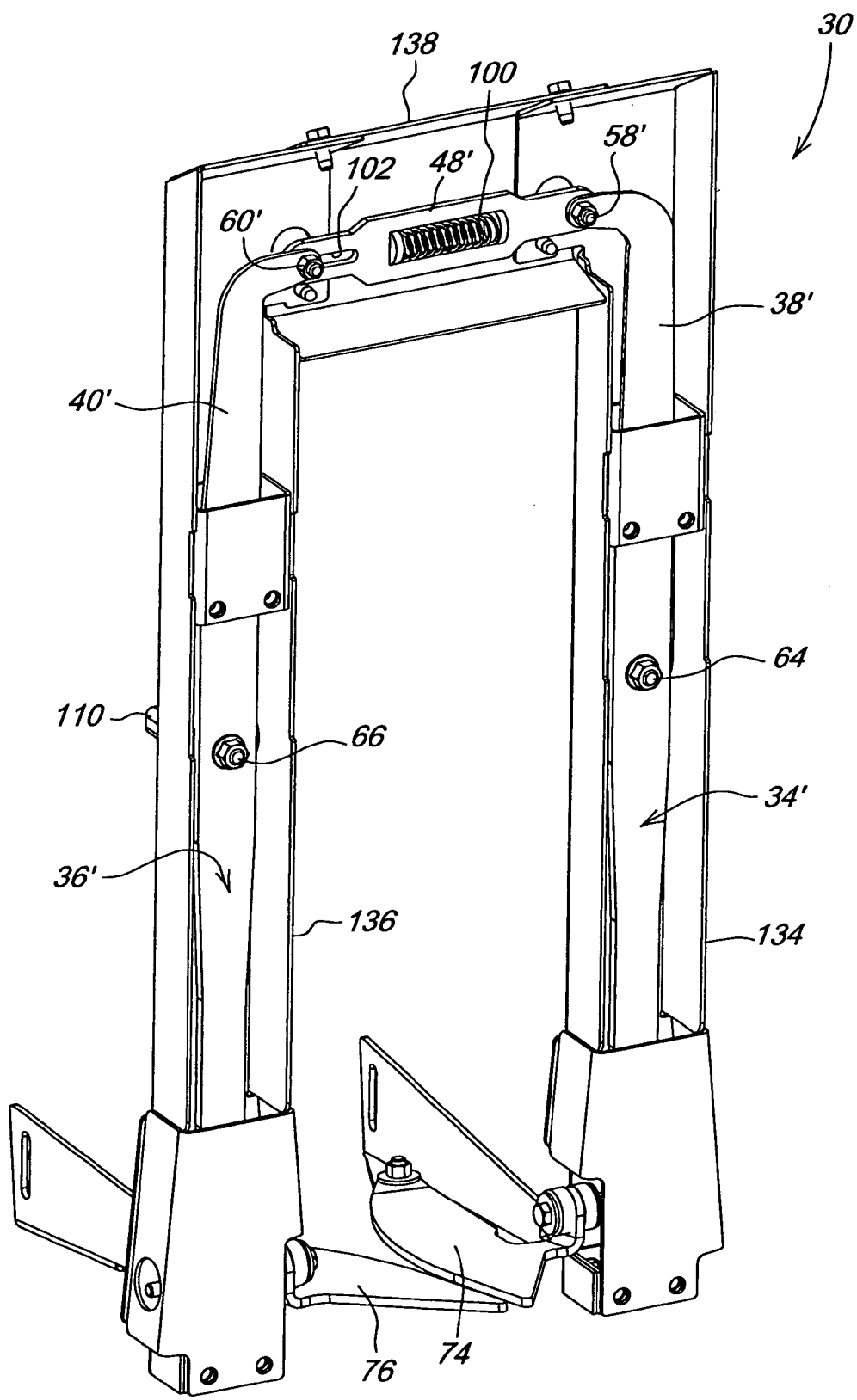
FIG. 4 is a rear perspective view of an alternate embodiment of the steering probe assembly.

The pivots 64 and 66 facilitate rocking of the arms 34 and 36 about fore-and-aft extending axes located on opposite sides of the throat area 16 at central locations in the vertical direction to maintain the crop guides 74 and 76 aligned with the row. The upper link structure 48 generally constrains the arms 34 and 36 for rocking in unison about the central pivots 64 and 66 and maintains the spacing between the crop guides 74 and 76 to accommodate movement of plant stalks between the guides. As shown in FIG. 3, the upper ends 38 and 40 of the arms are leaf springs connected by bracket structures 84 and 86 to lower portions 94 and 96 of the arms 34 and 36. The upper ends 38 and 40 can flex to allow the guides 74 and 76 to spread from the normal positions, for example, when large plant stalks are encountered to facilitate plant movement without damaging or tearing out plants and to prevent probe damage. Alternately, necessary probe resiliency may be provided in the lower portions 94 and 96 or in connections between upper and lower portions of the arms 34 and 36. As shown in the alternate embodiment of FIG. 4, the arms 34' and 36' are of one-piece construction and the upper link structure 48' is a variable length member biased outwardly to a stop position (shown). When large plant stalks or the like are encountered by the crop guides 74 and 76, bolt 60' is urged inwardly against the bias of a spring 100 along a slot 102 in the link structure 48' to allow the guides to spread outwardly relative to each other to prevent crop from being torn from the ground or otherwise damaged.

To provide a probe arm angle signal indicative of the position of the harvester row unit 10 relative to the row of plants passing between the crop guides 74 and 76, a rotary transducer 110 is one of the pivots 64 or 66. A line 112 connects an output of the rotary transducer 110 to a processor on the harvester (not shown) for providing a signal indicative of the row position relative to the unit. As the arms 34 and 36 rotate about the pivots 64 and 66 with changing row position relative to the throat area, an error signal is provided indicative of the amount and direction of misalignment of the unit relative to the row. The operator can manually steer the harvester in response to the error signal to reduce the misalignment, or an automatic steering system on the harvester can guide the harvester to reduce misalignment.

Since the arm length between the crop guides 74 and 76 and the centrally located pivot 66 is about half the distance associated with a conventional pendulum type probe having a centrally located upper pivot, the angular displacement of the transducer 110 will be nearly double that of the pendulum arrangement for a given change in row alignment. The reduced arm movement lessens the space required for the arms so that a more compact assembly can be provided. The probe frame assembly 70 is selectively attachable to either the row unit frame 12 at the throat area 16 or 18. The frame 70 is sandwiched between the unit frame 12 and the frames of the stalk lifters 24 and 26 for following the row of plants entering the throat area 16 as shown in FIG. 1. Alternately, the frame 70 may be sandwiched between the unit frame 12 and the frames of the stalk lifters 26 and 28 to monitor the row entering the throat area 18.

The central arm pivot locations also facilitate construction of the frame 70 to provide added protection for the probe assembly 30. The arms 34 and 36 are generally contained within rearwardly opening channel-shaped members 134 and 136, respectively, and prevent passing plants and debris from damaging the assembly or interfering with the movement of the arms. The frame 70 also includes an upper channel-shaped member 138 connecting the upper ends of the members 134 and 136 and containing the link structure 48. The link structure 48 is therefore also protected from passing plants and debris.

As the position of the harvester unit 10 moves laterally relative to the row of plants passing between the guides 74 and 76, the transducer 110 responsive to the pivoting of the arms 34 and 36 provides a position signal indicative of the relative position of the unit and the row. The signal is utilized to then guide the row unit 10 into proper relationship with the row.

Having described the preferred embodiment, it will become apparent that various modifications can be made without departing from the scope of the invention as defined in the accompanying claims.

What is claimed is:

1. In a harvester unit with a unit frame for receiving at least one fore-and-aft extending row of plants to be harvested, a row finder probe comprising first and second upright arms with upper ends, lower ends and central portions between the ends, connecting structure pivotally connecting the central portions arms to the unit frame, link structure connected between the upper ends and generally constraining the arms for pivoting in unison, plant receiving structure connected to the lower ends and receiving plants therebetween, the arms pivotable about fore-and-aft extending axes as the position of the harvester unit moves laterally relative to the row of plants, and a transducer responsive to the pivoting of the arms for providing a position signal indicative of the relative position of the unit and the row.

2. The row finder probe as set forth in claim 1 including a spring member biasing the lower ends towards each other and permitting the upright arms to pivot in opposite directions to facilitate passage of different sized plants between the lower ends.

3. The row finder probe as set forth in claim 1 wherein the link structure includes an adjustable length link connected between the upper ends and biased towards a preselected operating position wherein the lower ends are spaced a first distance apart, the movement of plants between the lower ends tending to spread the lower ends apart to move the upper ends against the bias as the lower ends encounter larger plants.

4. The row finder probe as set forth in claim 2 wherein the spring member comprises a leaf spring connected to at least one of the arms.

5. The row finder probe as set forth in claim 1 wherein the upper ends of the arms include leaf springs pivotally connected to the link.

6. The row finder probe as set forth in claim 1 wherein the arms and link structure comprise a 3-bar linkage.

7. The row finder probe as set forth in claim 6 wherein one of the ends of at least one of the arms comprises a flexible member facilitating lateral movement of the lower ends of the arms relative to each other.

8. The row finder probe as set forth in claim 7 wherein including crop guides connected to the lower ends of the arms.

9. The row finder probe as set forth in claim 1 wherein the unit frame comprises an ultra-narrow row cotton harvester unit frame.

10. The row finder probe as set forth in claim 9 wherein the unit frame includes first and second plant row receiving throats, and wherein the row finder probe is selectively connectible adjacent either of the throats.

11. The row finder probe as set forth in claim 1 including a probe frame supported from the unit frame and generally containing the upright arms, the probe frame protecting the probe from passing plants.

12. In a harvester unit with a unit frame for receiving at least one fore-and-aft extending row of plants to be harvested, a row finder probe comprising first and second upright arms with upper ends, lower ends and central portions between the ends connecting the central portions for pivoting relative to the unit frame, plant receiving structure connected to the lower ends and receiving plants therebetween, the arms pivotable about fore-and-aft extending axes as the position of the harvester unit moves laterally relative to the row of plants, a transducer responsive to the pivoting of the arms for providing a position signal indicative of the relative position of the unit and the row, and upright probe frame structure connected to the unit frame and generally containing the arms to thereby protect the arms from passing rows of plants.

13. The row finder probe as set forth in claim 12 further comprising link structure connected between the upper ends and generally constraining the arms for pivoting in unison.

14. The row finder probe as set forth in claim 13 further comprising an upper frame member structure connected to the upright probe frame structure and generally containing the link structure.

15. The row finder probe as set forth in claim 13 including spring structure yieldingly biasing the lower ends towards each other and permitting the lower ends to move outwardly relative to each other against the bias when encountering large plants.

16. The row finder probe as set forth in claim 15 wherein the spring structure comprises an end portion of the arms.

17. The row finder probe as set forth in claim 15 wherein the spring member comprises a spring supported by the link.

18. The row finder probe as set forth in claim 12 wherein the fore-and-aft extending axes are located at central locations on the upright arms substantially below the upper ends.

19. A row finder probe assembly comprising transversely spaced first and second upright arms having upper ends connected by a link member, spaced lower ends defining a row receiving area for receiving a fore-and-aft extending row of plants, and central portions between the upper and lower ends, a probe frame, pivot structure connecting the central portions to the frame structure, the arms pivotable generally in unison about fore-and-aft extending axes as the position of the frame moves laterally relative to the row of plants, a transducer responsive to the pivoting of the arms for providing a position signal indicative of the relative position of the frame and the row of plants, wherein the probe frame generally contains the arms to thereby protect the arms from the row of plants.

20. The row finder probe assembly as set forth in claim 19 including a biasing member connected to the upright arms and facilitating lateral movement of the spaced lower ends outwardly relative to each other against bias of the biasing member as plants of different sizes enter the row receiving area.

* * * * *